Patented Aug. 19, 1930

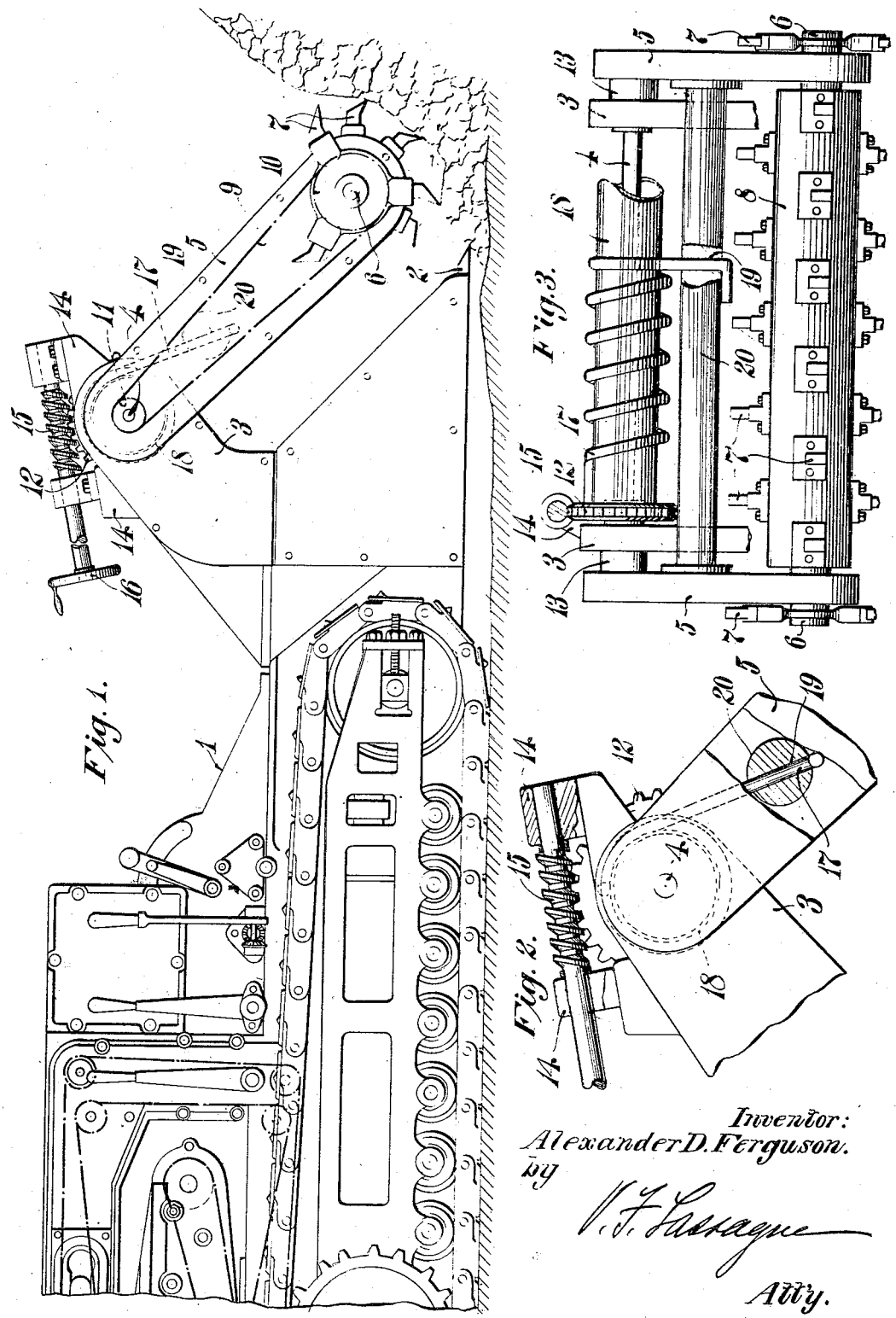

1,773,527

UNITED STATES PATENT OFFICE

ALEXANDER D. FERGUSON, OF MICHIGAN CITY, INDIANA, ASSIGNOR TO SULLIVAN MACHINERY COMPANY, A CORPORATION OF MASSACHUSETTS

LOADING MACHINE

Application filed April 17, 1925. Serial No. 23,950.

This invention relates to loading machines.

In loading machines, particularly of the type herein disclosed which is especially adapted for coal loading, I use a movable overhead element to rake the coal towards and feed it on to a lower nose piece. Ordinarily this rake is fairly heavy and it is accordingly desirable to vary the downward pressure thereof which will be exerted upon the material being loaded, for it is well known that different grades and sizes of coal necessitate the use of varying degrees of feeding pressure upon this rake. It is, however, highly desirable especially in machines of the type herein disclosed to allow this rake to move relatively freely so as to ride on or climb up on the coal pile. To attain the above conditions I have provided improved means for controlling the downward force exerted by the rake, the rake retaining none the less its essential flexibility and continuing to operate in the normal manner. In the mechanism herein specifically disclosed, the rake is of the rotary type having a series of teeth mounted thereon and is carried at the free end of parallel spaced arms pivotally mounted upon a stationary frame carried by the loading machine frame proper. In the specific embodiment of the invention, I have disposed my improved rake controlling means at the pivot point of the arms, although the same might be disposed in any other suitable place. It is also a further object of the invention to provide improved adjustable means for taking up a portion of the weight of the rake whereby the force with which the teeth of the rake are forced into engagement with the coal can be varied at the will of the operator and even while the machine is in operation.

In the accompanying drawings I have shown for purposes of illustration one form which my invention may assume in practice.

In these drawings,—

Fig. 1 is a side elevation of a loading machine with my improved mechanism associated therewith.

Fig. 2 is an enlarged fragmentary side elevation of the weight take-up mechanism.

Fig. 3 is an end view of the rake and weight take-up mechanism.

In the illustrative embodiment of my invention, I have shown my improved mechanism mounted upon a well known type of coal loader, generally indicated 1, and inasmuch as the details of construction thereof do not enter into the present invention, it will suffice to say that the same has a nose piece 2 and upwardly extending forwardly inclined parallel side arms or standards 3 carrying upon a pivot shaft 4 forwardly extending parallel arms 5 which carry at their free ends a shaft 6. A series of rake elements 7 radially disposed in any suitable number are mounted or supported in any suitable way around the periphery of a drum 8 mounted upon the shaft 6. The rake mechanism including the elements 6, 7 and 8 constitutes means for feeding the coal rearwardly and is adapted to be driven by any suitable mechanism herein by a chain 9 passing around a sprocket 10 fixed to the shaft 6 and the driving sprocket 11 concentric to the shaft 4. The sprocket 11 may in turn be driven by any suitable mechanism from the driving gear carried on the mining machine frame, it being understood of course that the arms 5 are hollow so as to enclose the chains and sprockets mentioned. During rotation of the rake the same will engage the coal pile and climb up thereon or feed the coal down, depending upon the character of the pile such as height, size of coal, etc.

In order to vary the downward pressure of the rake mechanism, which will be governed by the quality and size of the coal being loaded, I have provided a rotatable worm gear 12 fixed against axial movement but rotatable relative to a hub 13 attached to the arms 5. Carried in brackets 14 fixed to the forward end of one of the arms or standards 3 is a worm 15 meshing with the worm gear 12 and adapted to be rotated by a suitable hand wheel 16 or other mechanism as desired. Cooperating with the gears to vary the downward force of the rake and still allow relatively free movement thereof, I have provided a helical spring 17 surrounding a hollow shaft 18 which is concentric to the shaft 4. One end of the spring extends into a suitable opening in the worm wheel 12 while the other end extends through an opening 19 formed in a transverse bar 20 connecting the side arms 5.

In operation it will be seen that hand wheel rotation varies the tension of spring 17 and likewise the downward pressure exerted by the weight of the rake 7 and yet the relatively free movement of the rake is not impaired to such an extent that the coal or other material being loaded cannot be suitably engaged or that the rake cannot automatically climb the face of the pile or feed the material down upon the nose 2.

While I have in this application specifically described one form which my invention may assume in practice, it will be understood that this form of the same is used for purposes of illustration and that the invention may be modified and embodied in various other forms without departing from its spirit or the scope of the appended claims.

What I claim as new and desire to secure by Letters Patent is:

1. A loading machine comprising spaced standards, spaced arms having one end pivotally carried by said standards and having at the other end a rotatable feeding element, a coiled spring disposed concentric to said pivot and between said standards for varying the downward force to be exerted by said feeding means.

2. A loading machine comprising spaced standards, spaced arms having one end pivotally carried thereby and having at the other end a rotatable feeding element, a coiled spring disposed coaxial to said pivot and between said standards for varying the downward force adapted to be exerted by said feeding element, and gear mechanism for varying the tension of said spring.

3. A loading machine comprising spaced standards, spaced arms having one end pivotally carried thereby and having at the other end a rotatable feeding element, a coiled spring disposed concentric to said pivot and between said standards for varying the downward force adapted to be exerted by said feeding means, and gear mechanism for varying the tension of said spring including a worm and worm gear.

4. In a loading machine, a frame, a material penetrating nose piece carried by said frame, a mounting for a gathering device swingingly mounted on said frame, a gathering device rotatably mounted at the free end of said mounting, said device being free to move between a position closely adjacent said nose piece and a position a substantial distance above the same, means including a spring under torsional stress for exerting a force constantly tending to lift said mounting and device, and means for varying the torsion of said spring.

5. In a loading machine, a frame, a material penetrating nose piece carried thereby, a pair of arms mounted on said frame to swing on a horizontal axis, a gathering device rotatably mounted on the ends of said arms and movable between a position adjacent said nose piece and a position a substantial distance above the same, a coil spring surrounding the axis of pivoting of said arms and having one end connected to said arms at a point offset from said axis, and means for varying the torsion of said spring so as to vary the downward force exerted by said device on the material.

In testimony whereof I affix my signature.

ALEXANDER D. FERGUSON.